United States Patent
Leung et al.

(10) Patent No.: US 7,813,511 B2
(45) Date of Patent: Oct. 12, 2010

(54) FACILITATING MOBILITY FOR A MOBILE STATION

(75) Inventors: Kent K. Leung, Los Altos, CA (US); Jayaraman R. Iyer, Sunnyvale, CA (US); Viren K. Malaviya, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1019 days.

(21) Appl. No.: 11/173,051

(22) Filed: Jul. 1, 2005

(65) Prior Publication Data
US 2007/0005971 A1 Jan. 4, 2007

(51) Int. Cl.
*H04L 9/08* (2006.01)

(52) U.S. Cl. .................... 380/281; 726/7; 380/272; 713/151; 713/171

(58) Field of Classification Search .................. None
See application file for complete search history.

(56) References Cited

U.S. PATENT DOCUMENTS

| | | | |
|---|---|---|---|
| 7,339,903 B2 * | 3/2008 | O'Neill | 370/313 |
| 7,350,077 B2 * | 3/2008 | Meier et al. | 713/171 |
| 7,356,020 B2 * | 4/2008 | O'Neill | 370/349 |
| 7,409,549 B1 * | 8/2008 | Leung et al. | 713/168 |
| 7,441,269 B2 * | 10/2008 | Jones et al. | 726/14 |
| 7,474,650 B2 * | 1/2009 | O'Neill | 370/349 |
| 2002/0114469 A1 * | 8/2002 | Faccin et al. | 380/270 |
| 2003/0051140 A1 * | 3/2003 | Buddhikot et al. | 713/169 |
| 2004/0073786 A1 * | 4/2004 | O'Neill et al. | 713/155 |
| 2004/0077335 A1 | 4/2004 | Lee et al. | |
| 2004/0087304 A1 * | 5/2004 | Buddhikot et al. | 455/426.2 |
| 2004/0236939 A1 * | 11/2004 | Watanabe et al. | 713/150 |
| 2005/0025091 A1 | 2/2005 | Patel et al. | |
| 2005/0044365 A1 * | 2/2005 | Haukka et al. | 713/171 |
| 2005/0152305 A1 * | 7/2005 | Ji et al. | 370/328 |
| 2005/0254656 A1 * | 11/2005 | Rose et al. | 380/277 |
| 2006/0036733 A1 * | 2/2006 | Fujimoto et al. | 709/225 |
| 2006/0274695 A1 * | 12/2006 | Krishnamurthi et al. | 370/331 |
| 2007/0060106 A1 * | 3/2007 | Haverinen et al. | 455/410 |
| 2007/0250712 A1 * | 10/2007 | Salgado et al. | 713/171 |

(Continued)

FOREIGN PATENT DOCUMENTS

CN 1564626 A 1/2005

OTHER PUBLICATIONS

Tomás Balderas-Contreras, et al., "Security Architecture in UMTS Third Generation Cellular Networks", Reporte Técnico No. CCC-04-002, © Coordinación de Ciencias Computacionales, Instituto Nacional de Astrofísica, Óptica y Electrónica, INAOE, 19 pages, Feb. 27, 2004.

(Continued)

Primary Examiner—William R Korzuch
Assistant Examiner—Michael R Vaughan
(74) Attorney, Agent, or Firm—Baker Botts L.L.P.

(57) ABSTRACT

Providing a mobility key for a communication session for a mobile station includes facilitating initiation of the communication session. A master key for the communication session is established, where the master key is generated at an authentication server in response to authenticating the mobile station. A mobility key is derived from the authentication key at an access node, where the mobility key is operable to authenticate mobility signaling for the communication session.

8 Claims, 3 Drawing Sheets

U.S. PATENT DOCUMENTS

2009/0208013 A1* 8/2009 Watanabe et al. ........... 380/272

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US 06/25514, dated May 3, 2007, 8 pages.

State Intellectual Property Office of the People's Republic of China, The First Office Action and Text of the First Office Action, transmitted to Baker Botts Mar. 20, 2009, Chinese and English translation, 18 pages.

The Patent Office of the People's Republic of China, The Second Office Action and Text of the Second Office Action, Application No. 200680020027.0 transmitted to Baker Botts Nov. 16, 2009, 9 pages.

* cited by examiner

FACILITATING MOBILITY FOR A MOBILE STATION

TECHNICAL FIELD

This invention relates generally to the field of communications and more specifically to facilitating mobility for a mobile station.

BACKGROUND

A communication network may establish a communication session for a mobile station. The communication session allows the mobile station to communicate with other endpoints. The mobile station may move to another location serviced by a different communication network. Accordingly, techniques are implemented to allow the next communication network to support the communication session.

Known techniques, however, are not efficient in certain situations. It is generally desirable to have efficient techniques in certain situations.

SUMMARY OF THE DISCLOSURE

In accordance with the present invention, disadvantages and problems associated with previous techniques for facilitating mobility for a mobile station may be reduced or eliminated.

According to one embodiment of the present invention, providing a mobility key for a communication session for a mobile station includes facilitating initiation of the communication session. A master key for the communication session is established, where the master key is generated at an authentication server in response to authenticating the mobile station. A mobility key is derived from the authentication key at an access node, where the mobility key is operable to authenticate mobility signaling for the communication session.

Certain embodiments of the invention may provide one or more technical advantages. A technical advantage of one embodiment may be that a mobility key may be derived from a master key. Deriving the mobility key may provide for a more readily available key. Another technical advantage of one embodiment may be that a route may be optimized to bypass a home agent. Bypassing the home agent may provide for more efficient communication.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
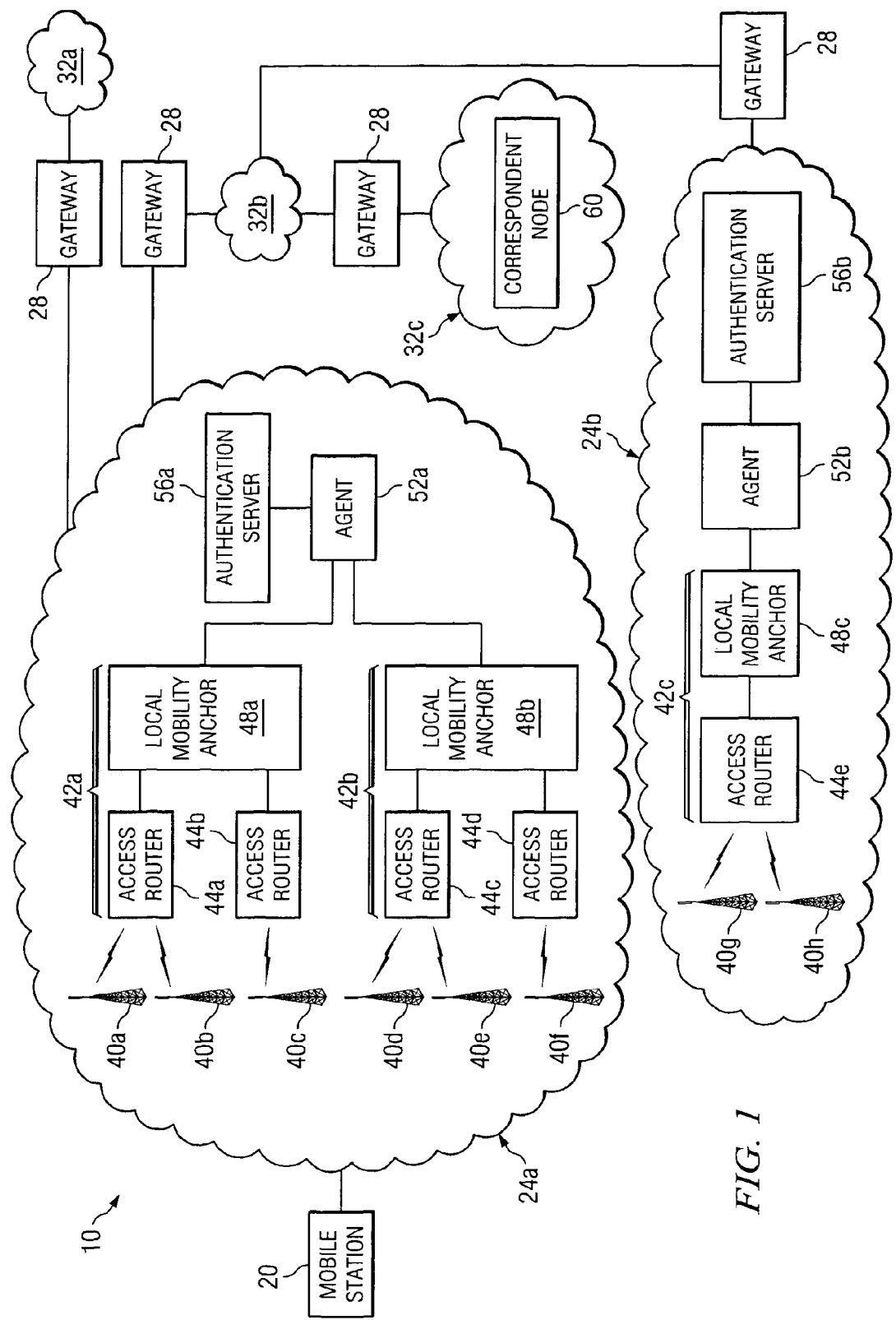
FIG. 1 is a block diagram illustrating one embodiment of a system operable to facilitate mobility for a mobile station.
Figure 2:
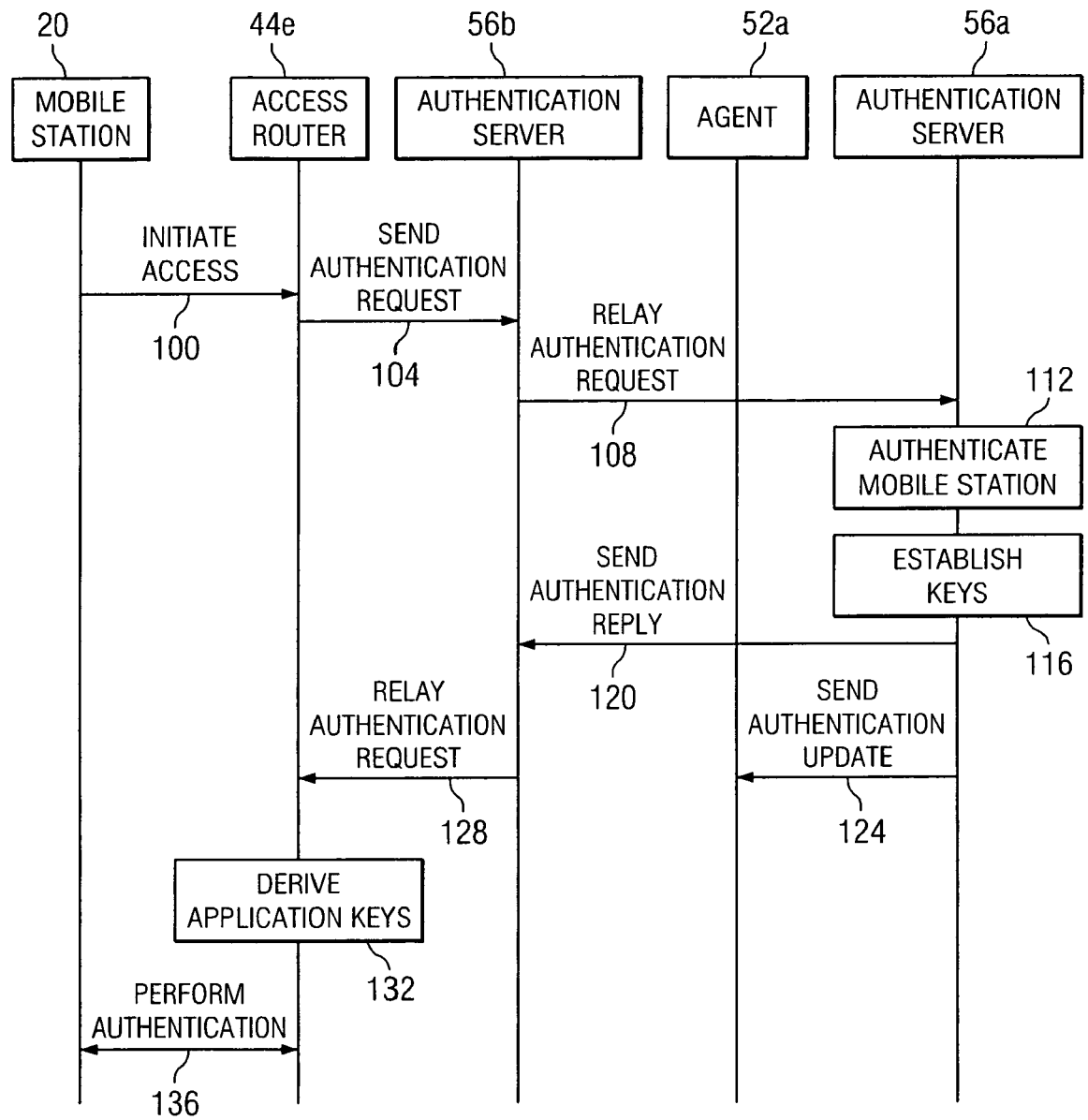
FIG. 2 is a call flow diagram illustrating one embodiment of a method for providing a mobility key for a communication session.
Figure 3:
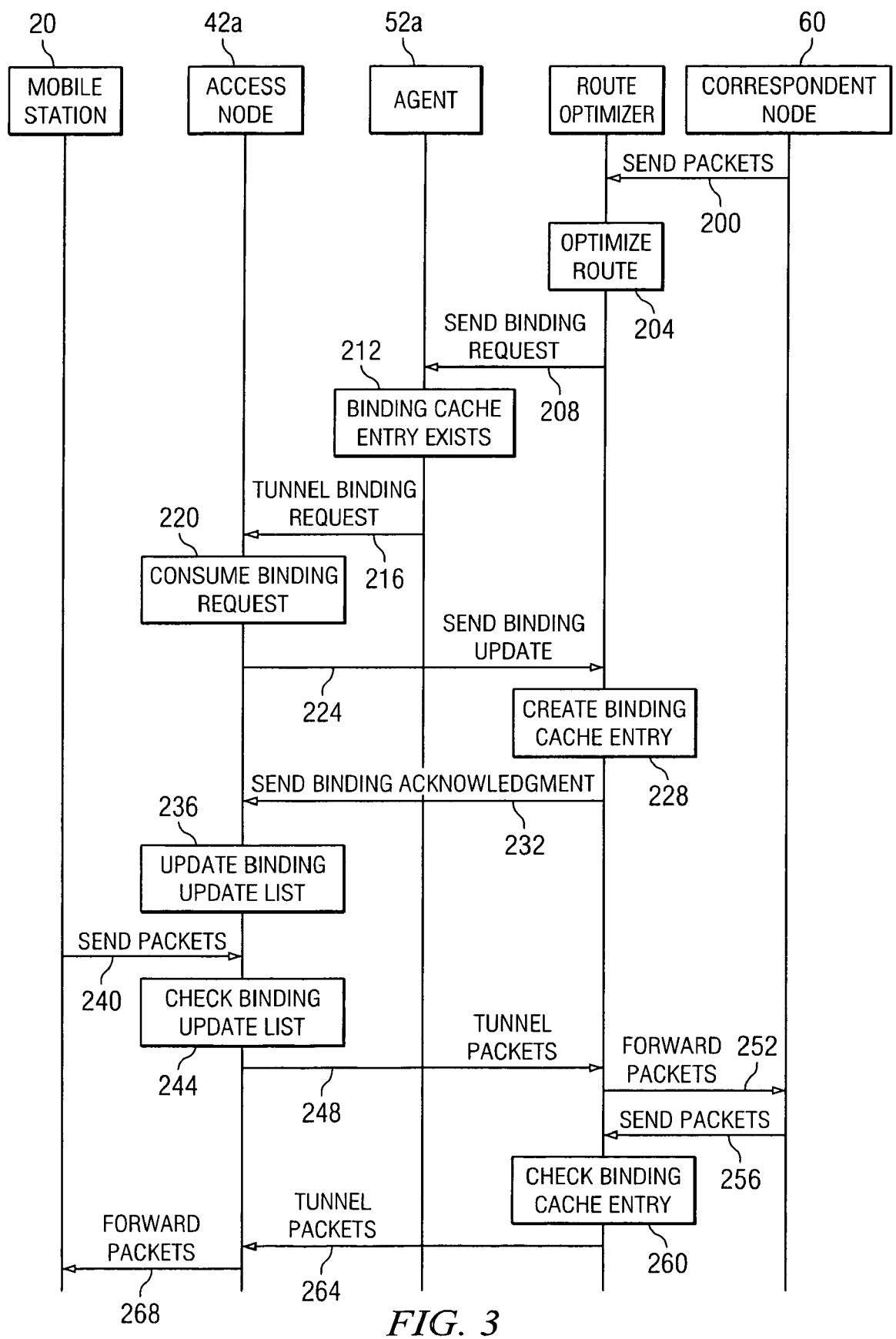
FIG. 3 is a call flow diagram illustrating one embodiment of a method for optimizing a route for a communication session.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 operable to facilitate mobility for a mobile station. System 10 may provide a mobility key for a communication session for the mobile station. To provide the mobility key, a master key for the communication session may be established. The mobility key may then be derived from the master key. System 10 may also provide route optimization for the communication session. The optimized route communicates the session along a path that bypasses a home agent for the mobile station.

According to the illustrated embodiment, a mobile station 20 may represent any suitable logic comprising software, hardware, other logic, or any suitable combination of the preceding operable to communicate with a communication system. Mobile station 20 may comprise, for example, a personal digital assistant, a cellular telephone, a mobile handset, or any other device operable to communicate with system 10.

System 10 may operate to provide telephony services, such as communication sessions, for endpoints such as mobile station 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 10 and mobile station 20 may utilize digital cellular protocols and technologies for the communication sessions. Example digital cellular protocols and technologies include those set by the Institute of Electrical and Electronics Engineers, Inc. (IEEE) 802.11 standards, the Global System for Mobile communications (GSM) standards, the Internet Engineering Task Force (IETF) standards, or other standards. GSM standards may support technology such as general packet radio service (GPRS) technologies, and IETF standards may support code division multiple access (CDMA) technologies.

According to the illustrated embodiment, system 10 includes a home network 24a, a foreign network 24b, one or more gateways 28, and one or more other networks 32 coupled as shown. According to the embodiment, networks 24 comprise communication networks that facilitate communications sessions for mobile station 20. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Home network 24a may represent a communication network at which mobile station 20 is permanently registered, and foreign network 24b may represent a communication network in which mobile station 20 is currently located. According to the illustrated embodiment, each network 24 comprises one or more base stations 40, one or more access nodes 42, a home agent 52, and an authentication server 56 coupled as shown.

A base station 40 provides mobile station 20 with wireless access to system 10. Base station 40 may include a base transceiver station and a base station controller. The base transceiver station communicates signals to and from mobile station 20. The base station controller manages the operation of the base transceiver station. The wireless link between mobile station 20 and base station 40 is typically a radio frequency link that may be cellular in network organization.

An access node 42 may represent a point of a network 24 that provides access to network 24, and may provide access services such as protocol conversion, packet encapsulation and decapsulation, or other service. Access node 42 may comprise any suitable arrangement of components, such as one or more access routers 44, one or more local mobility anchors 48, or any combination of the preceding. As an example, an access node 42 may include one or more access routers 44, but no local mobility anchors 48. As another example, an access node 42 may include one or more access routers 44 and one or more local mobility anchors 48.

Access router 44 may represent any suitable logic comprising software, hardware, other logic, or any combination of the preceding operable to connect asynchronous devices such as mobile station 20 to network 24. According to one embodiment, access router 44 may provide a point at which the Open Systems Interconnection (OSI) Model Layer 2 signaling meets Layer 3 signaling for mobile station 20.

Local mobility anchor 48 may represent any suitable logic comprising software, hardware, other logic, or any combination of the preceding operable to provide mobility management aggregation services for access routers 44. In general, an anchor may refer to a point of a network that manages roaming connections for a communication session. Local mobility anchor 48 operates like an agent 52 from the viewpoint of access routers 44, and operates like an access router 44 from the viewpoint of agent 52. According to one embodiment, local mobility anchor 48 may encapsulate and decapsulate traffic, such as data traffic.

A component of access node 42 may intercept and consume messages directed to another node. According to one embodiment, local mobility anchor 48 may intercept a signaling message directed to another node, such as mobile station 20. A signaling message may refer to a message that includes an instruction to perform an operation to set up, manage, or tear down a communication session. A message may be directed to a node by having the address of the node as the destination address.

According to the embodiment, local mobility anchor 48 may intercept a signaling message that is directed to another node. Local mobility anchor 48 may be programmed to intercept specific signaling messages directed to the other node. Local mobility anchor 48 may consume the signaling message by performing the operation of the message, and not forwarding the message to the other node.

An agent 52 may represent any suitable logic comprising software, hardware, other logic, or any suitable combination of the preceding operable to provide mobility management services for mobile station 20. Home agent 52a of mobile station 20 may represent an agent that maintains the address of mobile station 20 and forwards packets to mobile station 20. According to one embodiment, home agent 52 may generate a master key, from which a mobility key may be derived. The master key and mobility key are described in more detail with reference to FIG. 2. Foreign agent 52b of mobile station 20 may represent an agent that provides home agent 52a of mobile station 20 with a care-of address to which packets for mobile station 20 node may be forwarded.

If mobile station 20 is in an area serviced by home agent 52a, home agent 52a forwards traffic to the location address of mobile station 20. If mobile station 20 moves to an area serviced by foreign agent 52b, foreign agent 52b notifies home agent 52a that mobile station 20 has moved, and sends a care-of address for mobile station 20 to home agent 52a. Home agent 52a forwards traffic to the care-of address.

Authentication server 56 may represent any suitable logic comprising software, hardware, other logic, or any suitable combination of the preceding operable to provide services for authentication, authorization, accounting, or any suitable combination of the preceding. Authentication may refer to authenticating a mobile station 20. Authorization may refer to authorizing a level of service for mobile station 20. Accounting may refer to tracking the usage of resources. As an example, authentication server 56 may provide one, two, or three of the listed services.

A gateway 28 may represent any suitable logic comprising software, hardware, other logic, or any suitable combination of the preceding operable to interconnect networks 24 and 32. Gateway 28 may perform protocol conversion. For example, gateway 28 may convert communications from the protocol of one network to the protocol of another network. According to one embodiment, gateway 28 may include a route optimizer that provides route optimization. Route optimization is described in more detail with reference to FIG. 3.

A network 32 may represent any suitable communication network. As an example, network 32a may represent a legacy network. As another example, network 32b may represent a Internet Protocol (IP) network that operates according to the Internet Protocol. As yet another example, network 32c may represent an intranet that includes a correspondent node 60 engaged in a communication session with mobile station 20. Correspondent node 60 may represent any suitable logic comprising software, hardware, other logic, or any suitable combination of the preceding operable to communicate with mobile station 20.

A component of system 10 may include an interface, logic, memory, or any suitable combination of the preceding. As used in this document, "interface" refers to any suitable structure of a device operable to receive input for the device, send output from the device, translate input or output or both, or perform any combination of the preceding, and may comprise one or more ports. Logic manages the operation of module, and may comprise any suitable hardware, software, or combination of hardware and software. For example, logic may include a processor. As used in this document, "processor" refers to any suitable device operable to execute instructions and manipulate data to perform operations.

As used in this document, "memory" refers to any structure operable to store and facilitate retrieval of information used by a processor, and may comprise Random Access Memory (RAM), Read Only Memory (ROM), magnetic drives, disk drives, Compact Disk (CD) drives, Digital Video Disk (DVD) drives, removable media storage, any other suitable data storage device, or a combination of any of the preceding.

The mobility state of mobile station 20 may be maintained by access node 42 and other nodes of system 10 that facilitate a communication session for mobile station 20, such as home agent 52a and gateways 28. The mobility state may be described by a binding cache entry, a binding update list, a data flow cache entry, other mobility descriptor, or any combination of the preceding.

A binding cache entry records information for routing packets to mobile station 20. For example, a binding cache entry may record an address, such as home address or a care-of address or both, to which packets for mobile station 20 may be forwarded. The binding cache entry may include other information about mobile station 20, such as the state of the communication session of mobile station 20. A binding update list records information for routing packets to correspondent node 60. For example, a binding update list may record addresses for access routers or gateways used by correspondent node 60. A data flow cache entry may refer to information learned from received data flows.

Messages may provide or request mobility state information. For example, a binding update from a sender provides updated routing information about the sender. A binding acknowledgement confirms that a binding update was received. A binding request from a sender to a receiver requests that the receiver send a binding update to the sender. A binding delete from a sender to a receiver requests that the receiver remove the binding cache entry associated with the sender.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of access router 44 and local mobility anchor 48 may be performed by one module, or the operations of agent 52a may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a call flow diagram illustrating one embodiment of a method for providing a mobility key for a communication session. To provide the mobility key, a master key for the communication session may be established. The mobility key may then be derived from the master key.

The method begins at step 100, where mobile station 20 initiates access to foreign network 24b through foreign access router 44e of network 24b. Access router 44e sends an authentication request to foreign authentication server 56b at step 104. An authentication request may refer to a message that requests authentication for a node. The message may also request other services such as authorization, accounting, other service, or any combination of the preceding.

Authentication server 56b relays the authentication request to home authentication server 56a at step 108. Authentication server 56a authenticates mobile station 20 at step 112. According to one embodiment, home authentication server 56a authenticates mobile station 20 according to an authentication key. A key may refer to an encryption key or decryption key. An authentication key may refer to a key that is used to verify the authenticity of a mobile station 20. According to one embodiment, a mobile station-authentication server (MS-AS) key may be used to authenticate mobile station 20. An MS-AS key may refer to an authentication key shared between mobile station 20 and home authentication server 56a.

Authentication server 56a derives a master key at step 116. In general, a second key may be derived from a first key by applying a procedure or algorithm to the first key to yield the second key. A master key may refer to an authentication key that is used to authenticate mobile station 20 for a particular time. For example, a master key comprising a master session key may refer to an authentication key that is used to authenticate mobile station 20 for a particular communication session. According to one embodiment, home authentication server 56a derives a master session key from the MS-AS key.

Authentication server 56a sends an authentication reply to foreign authentication server 56b at step 120. According to one embodiment, the authentication reply includes the master session key. Home authentication server 56a sends an authentication update to home agent 52a at step 124. The update includes an application key. An application key may refer to an authentication key that is used to authenticate mobile station 20 for a particular application, such as a mobility or access application. According to one embodiment, the application key comprises a mobile IP application key derived from the master session key for the duration of the registration process. Foreign authentication server 56a relays the authentication reply to access router 44a at step 128. The reply includes the master session key.

Access router 44e derives application keys from the master key at step 132. According to one embodiment, a mobility key and an access key may be derived from the master session key. A mobility key may refer to an authentication key that may be used to provide mobility management, such as Layer 3 mobility management. The key may be used to authenticate signaling among network nodes during a handoff procedure. According to the embodiment, a mobile station-network node key may be used to authenticate signaling to the network node in order to send signaling messages to the network node. For example, a mobile station-home agent (MN-HA) key may be used to authenticate signaling to home agent 52a. The MN-HA key may be used on the behalf of mobile station 20 to send a signaling message, such as a binding update, to home agent 52a.

An access key may refer to an authentication key that is used to provide access authentication, such a authentication for example Layer 2 access. According to the embodiment, the derived access key may comprise a mobile station-access router (MS-AR) Layer 2 key that provides Layer 2 access while access router 44 is facilitating the communication session for mobile node 20.

Access authentication is performed at step 136 using the derived mobility key. According to one embodiment, the derived mobility key may comprise the MS-AR key. After performing access authentication, the method terminates.

Modifications, additions, or omissions may be made to the method without departing from the scope of the invention. The method may include more, fewer, or other steps. Additionally, steps may be performed in any suitable order without departing from the scope of the invention.

FIG. 3 is a call flow diagram illustrating one embodiment of a method for optimizing a route for a communication session. The method may optimize a communication path by bypassing home agent 52a. The method may be performed by a first embodiment, a second embodiment, or other suitable embodiment. According to the first embodiment, access node 42 includes one or more access routers 44. According to the second embodiment, access node 42 includes one or more access routers 44 and one or more local mobility anchors 48.

The method begins at step 200, where correspondent node 60 sends packets to a route optimizer. The route optimizer may be located at gateway 28 or other suitable node of system 10. The route optimizer determines whether route optimization is to be performed at step 204. The determination may be made by establishing the non-optimized route and determining whether bypassing home agent 52a would optimize the route. In this example, the route optimizer determines that route optimization is to be performed.

The route optimizer sends a binding request to home agent 52a at step 208. The binding request requests that a receiver sends a binding update of mobile station 20 to the route optimizer, and may be sent as a control message. Home agent 52a has a binding cache entry for mobile station 20 at step 212, and tunnels the binding request to access node 42a at step 216.

Access node 42a consumes the binding request at step 220, and sends a binding update at step 224. The binding update includes the home address of access node 42a, and may be sent as a control message. Steps 220 and 224 may be performed by the first embodiment, the second embodiment, or other suitable embodiment. According to the first embodiment, access router 44a consumes the binding request at step 220, and sends the binding update at step 224. According to the second embodiment, local mobility anchor 48a consumes the binding request at step 220, and sends the binding update at step 224.

The route optimizer creates a binding cache entry for mobile station 20 at step 228. The binding cache entry records access node 42a as the home address of mobile station 20. Step 228 may be performed by the first embodiment, the second embodiment, or other suitable embodiment. According to the first embodiment, the recorded access node 42a is access router 44a. According to the second embodiment, the recorded access node 42a is local mobility anchor 48a. The route optimizer sends a binding acknowledgement to access node 42a at step 232. The binding acknowledgement includes the home address of the route optimizer. Access node 42a updates its binding update list at step 236. The binding update list records that correspondent node 60 communicates through the route optimizer.

Mobile station 20 sends a packet destined for correspondent node 60 to access node 42a at step 240. Access node 42a checks its binding update list at step 244. The binding update list indicates that correspondent node 60 may be reached through the route optimizer. Access node 42a tunnels the packet to the route optimizer at step 248. Steps 244 and 248 may be performed by the first embodiment, the second embodiment, or other suitable embodiment. According to the first embodiment, access router 44a receives the packet from mobile station 20, and tunnels the packet to the route optimizer. According to the second embodiment, access router receives the packet from mobile station 20, and tunnels the packet to local mobility anchor 48. Local mobility anchor identifies the route optimizer, and tunnels the packet to the route optimizer. The route optimizer forwards the packet to correspondent node 60 at step 252.

Correspondent node 60 sends a packet destined for mobile station 20 to the route optimizer at step 256. The route optimizer checks its binding cache entry for mobile station 20 at step 260, and tunnels the packet to access node 42a according to the entry at step 264. Steps 260 and 264 may be performed by the first embodiment, the second embodiment, or other suitable embodiment. According to the first embodiment, the binding cache entry at the route optimizer instructs the route optimizer to tunnel the packet directly to access router 44a. According to the second embodiment, the binding cache entry at the route optimizer instructs the route optimizer to tunnel the packet to local mobility anchor 48a. The binding cache entry at local mobility anchor 48a has a binding cache entry for mobile station instructs local mobility anchor 48a to tunnel the packet to access router 44a. Access node 42 forwards the packet to mobile station at step 268.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a mobility key may be derived from a master key. Deriving the mobility key may provide for a more readily available key. Another technical advantage of one embodiment may be that a route may be optimized to bypass a home agent. Bypassing the home agent may provide for more efficient communication.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing a mobility key for a communication session, comprising:

facilitating initiation of the communication session for a mobile station;

receiving a master key at an access router of a foreign network, the foreign network distinct from a wireless local area network, the master key received from a foreign authentication server located in the foreign network and operable to receive the master key from a home authentication server located in a home network of the mobile station, the home network operable to authenticate the mobile station at the home authentication server to verify the authenticity of the mobile station, generate a master key for the communication session in response to authenticating the mobile station, and send the master key to the foreign authentication server;

deriving one or more mobility keys from the master key in response to the same authentication request, the mobility keys derived at the access router and independent of the mobile station, the mobility keys including a mobile station-network node key shared between the mobile station and a network node, the mobile station-network node key operable to authenticate mobility signaling to the network node of the communication network, the access router distinct from the foreign authentication server, each mobility key of the one or more mobility keys used by the access router to send messages on behalf of the mobile station and independently of the mobile station, the mobility keys operable to authenticate layer 3 mobility signaling for the communication session;

deriving an access key from the master key, the access key operable to authenticate layer 2 messaging for the communication session; and sending a signal message to the network node, the signal message authenticated using the mobile station-network node key.

2. The method of claim 1, wherein:

the one or more mobility keys include a mobile station-home agent key shared between the mobile station and a home agent, the mobile station-home agent key operable to authenticate mobility signaling to the home agent; and further comprising:
sending a binding update to the home agent, the binding update providing updated routing information to the home agent;
authenticating the binding update sent to the home agent using the mobile station-home agent key.

3. A node for determining a mobility key for a communication session, comprising:
an interface operable to receive a plurality of packets; and
logic coupled to the interface and operable to:
facilitate initiation of the communication session for a mobile station;
receive a master key at an access router of a foreign network, the foreign network distinct from a wireless local area network, the master key received from a foreign authentication server located in the foreign network and operable to receive the master key from a home authentication server located in a home network of the mobile station, the home network operable to authenticate the mobile station at the home authentication server to verify the authenticity of the mobile station, generate a master key for the communication session in response to authenticating the mobile station, and send the master key to the foreign authentication server;
derive one or more mobility keys from the master key in response to the same authentication request, the mobility keys derived at the node and independent of the mobile station, the mobility keys including a mobile station-network node key shared between the mobile station and a network node, the mobile station-network node key operable to authenticate mobility signaling to the network node of the communication network, the node comprising an access router distinct from the foreign authentication server, each mobility key of the one or more mobility keys used by the node to send messages on behalf of the mobile station and independently of the mobile station, the mobility key operable to authenticate layer 3 mobility signaling for the communication session;
derive an access key from the master key, the access key operable to authenticate layer 2 messaging for the communication session; and
send a signal message sent to the network node, the signal message authenticated using the mobile station-network node key.

4. The node of claim 3, wherein:
the one or more mobility keys include a mobile station-home agent key shared between the mobile station and a home agent, the mobile station-home agent key operable to authenticate mobility signaling to the home agent; and
a binding update sent to the home agent to provide updated routing information to the home agent is authenticated using the mobile station-home agent key.

5. The node of claim 3, wherein:
the one or more mobility keys include:
a mobile station-network node key shared between the mobile station and a network node, the mobile station-network node key operable to authenticate mobility signaling to the network node of the communication network; and
a mobile station-home agent key shared between the mobile station and a home agent, the mobile station-home agent key operable to authenticate mobility signaling to the home agent; and
a signal message sent to the network node is authenticated using the mobile station-network node key; and
a binding update sent to the home agent to provide updated routing information to the home agent is authenticated using the mobile station-home agent key.

6. A system for providing a mobility key for a communication session, comprising:
means for facilitating initiation of the communication session for a mobile station;
means for receiving a master key at an access router of a foreign network, the foreign network distinct from a wireless local area network, the master key received from a foreign authentication server located in the foreign network and operable to receive the master key from a home authentication server located in a home network of the mobile station, the home network operable to authenticate the mobile station at the home authentication server to verify the authenticity of the mobile station, generate a master key for the communication session in response to authenticating the mobile station, and send the master key to the foreign authentication server;
means for deriving one or more mobility keys from the master key in response to the same authentication request, the mobility keys derived at the access router and independent of the mobile station, the mobility keys including a mobile station-network node key shared between the mobile station and a network node, the mobile station-network node key operable to authenticate mobility signaling to the network node of the communication network, the access router distinct from the foreign authentication server, each mobility key of the one or more mobility keys used by the access node to send messages on behalf of the mobile station and independently of the mobile station, the mobility key operable to authenticate layer 3 mobility signaling for the communication session;
means for deriving an access key from the master key, the access key operable to authenticate layer 2 messaging for the communication session; and
sending a signal message to the network node, the signal message authenticated using the mobile station-network node key.

7. A network for providing a mobility key for a communication session, comprising:
a home authentication server located in a home network of a mobile station operable to:
facilitate initiation of the communication session for the mobile station;
receive an authentication request from a foreign authentication server located in a foreign network, the foreign network distinct from a wireless local area network;
authenticate the mobile station to verify the authenticity of the mobile station;
generate a master key for the communication session in response to authenticating the mobile station;
send the master key to the foreign authentication server, the foreign authentication server configured to relay the master key to an access router of the foreign network; and
the access router distinct from the foreign authentication server and operable to:
derive, independent of the mobile station, one or more mobility keys from the master key in response to the same authentication request, the mobility keys including a mobile station-network node key shared between the mobile station and a network node, the mobile station-network node key operable to authenticate mobility signaling to the network node of the communication network, each mobility key of the one or more mobility keys used by the access node to send messages on behalf of the mobile station and independently of the mobile station, the mobility key operable to authenticate layer 3 mobility signaling for the communication session;

derive an access key from the master key, the access key operable to authenticate layer 2 messaging for the communication session; and send a signal message to the network node, the signal message authenticated using the mobile station-network node key.

8. The network of claim 7, wherein:

the one or more mobility keys include a mobile station-home agent key shared between the mobile station and a home agent, the mobile station-home agent key operable to authenticate mobility signaling to the home agent; and further comprising the home agent operable to:

receive a binding update, the binding update providing updated routing information to the home agent;

authenticate the binding update using the mobile station-home agent key.

\* \* \* \* \*